United States Patent [19]
Azrad (Weisz)

[11] 3,909,454
[45] Sept. 30, 1975

[54] METHOD FOR ACTIVATION OF BENTONITES

[76] Inventor: Anat Azrad (Weisz), Batiah Makov Str. 14, Rehovoth, Israel

[22] Filed: Feb. 25, 1974

[21] Appl. No.: 445,660

[30] Foreign Application Priority Data
Mar. 13, 1973 Israel........................ 41757

[52] U.S. Cl.............. 252/455 R; 252/456; 252/457; 252/458; 252/459; 252/460
[51] Int. Cl.²............................................ B01J 29/06
[58] Field of Search........ 252/455 R, 458, 456, 457, 252/459, 460

[56] References Cited
UNITED STATES PATENTS

| | | | |
|---|---|---|---|
| 2,107,215 | 2/1938 | Rembert | 252/455 R X |
| 2,408,207 | 9/1946 | Garrison et al. | 252/455 R X |
| 3,148,158 | 9/1964 | Schenck et al. | 252/455 R X |
| 3,184,414 | 5/1965 | Koch et al. | 252/455 R |
| 3,213,037 | 10/1965 | Hodgkiss | 252/455 R X |
| 3,459,815 | 8/1969 | Noddings et al. | 252/458 X |

*Primary Examiner*—Paul F. Shaver
*Attorney, Agent, or Firm*—John S. Roberts, Jr.

[57] ABSTRACT

A method for activation of bentonites is described. The method comprises a prior treatment of the bentonite with an organic polymer and/or an aqueous alkaline solution as known from prior art. Subsequently, an amount of 0.01 – 10% by weight from the treated bentonite of a heavy metal salt is incorporated into the pretreated bentonite and then dried at a temperature not higher than 400°C. The cation in the heavy metal salt is selected from Fe, Ni, Zn, Co, Cr, and Mn.

7 Claims, No Drawings

METHOD FOR ACTIVATION OF BENTONITES

The present invention relates to a method for activating bentonites and is more particularly concerned with improving their rheological properties. As known, bentonite is chiefly a crystalline clay mineral belonging to the montmorillonite group, being a hydrous aluminum silicate containing iron, magnesium and other elements. The structural characteristics and composition of montmorillonite may vary in a broad range and the physical properties of the bentonite will vary accordingly depending on the nature of the montmorillonite. In commercial uses, there is a tendency to restrict the term of bentonite to clay materials with relatively high colloidal and thixotropic properties.

Bentonite has a broad range of uses such as in drilling fluids, cement, as adsorbent in clarification of wines, the pharmaceutical field, suspending and stabilizing agents etc. One of the main applications of bentonite is in the search for petroleum findings as a component in drilling fluids. A great deal of valuable research from the point of view of colloid chemistry has been carried out on the properties of drilling fluids. As known, during actual drilling, the fluid is circulated continuously to rmove cuttings and the fluid must have a viscosity greater than pure water. Generally, apparent viscosity of the order of 15 centipoises is about the usual norm of good drilling. Other requirements of the drilling fluid is the so-called gel strength which is the difference in yield value immediately after agitation and after ten minutes standing. The known method by which bentonites can be improved in their rheological properties is by treatment with a sodium compound which causes a cation exchange with the calcium ion present in the mineral. However, for many bentonites, especially of a low grade, this activation does not improve all their rheological properties in making them suitable for the various uses. The conclusion which many workers have drawn is that no chemical treatment process could be expected which would simultaneously improve all the rheological properties of normal bentonite and especially of low grade bentonite.

In the ordinary course of drilling, clay-water muds tend to increase in consistency, which results in an increase in gel strength. The change in consistency may be the result of drilling through mud-making formation or the result of the addition of soluble salts such as sodium chloride, calcium sulphate and the like. Attempts were made to treat such thickened muds with the materials found useful in ceramic slip, particularly sodium hydroxide, sodium carbonate and sodium silicate. Such attempts were largely unsuccessful; the mechanism of the production of the gel is still controversial but it may arise from quite different causes than those operative in china clays. To-day, the chemical reagents used for degelling drilling muds by chemical treatment fall mainly into two groups: (1) inorganic complex phosphates and (2) organic weak acids of general high molecular weight such as tannstuffs or organic polymers such as starch, acrylate-acrylamide copolymers etc. Examples of inorganic complex phosphates are sodium pyrophosphate, sodium tripolyphosphate etc. However, these chemical reagents tend to improve only one of the rheological properties of bentonite and additional treatments and chemicals are required to improve the other properties.

It is the object of the present invention to describe a method for activating bentonites by improving their rheological properties. It is another object of the present invention to describe a simple method whereby most of the rheological properties of bentonites are improved at the same time without any additional treatment. These, and other objects of the invention which may appear and be appreciated by those skilled in the art as this specification proceeds, are achieved by this invention. The invention, therefore, consists of a method for the activation of bentonite which entails treating the bentonite with 0.25–10% by weight of bentonite of an organic polymer and an aqueous alkaline solution as known, the improvement being the incorporation into the treated bentonite of an amount of 0.1–10% by weight from the pretreated bentonite of a heavy metal salt and drying the activated bentonite mass at a temperature not higher than 400°C.

The discovery of improving the rheological properties of bentonites by incorporating small amounts of a heavy metal salt is very surprising in view of many statements found in prior art, which point out that the presence of metal salt in the bentonite adversely affects its use in the drilling fluid, i.e. affecting its colloidal properties. The inventor could not find a reasonable theory to explain the discovery; it seems that the small amount of the heavy metal salt has the role of a catalytic effect, since its presence is absolutely requisite in order to obtain a bentonite with the improved properties. This discovery was tested on a large number of bentonites from various parts of the world and, as can be seen from the results given in the tables in this specification, remarkably improved properties were achieved in all the bentonites tested. Although bentonites are known to exhibit enhanced colloidal properties, it seems perhaps reasonable to assume that, by this treatment, a change in the colloidal nature of the bentonite occurs rather than a change in the crystal structure. In view of the complexity of the clays system, it is not necessary to go further in the theoretical aspects of the present invention.

The entire method is very simple to carry out. The bentonite is ground and thoroughly mixed with an organic polymer. Examples of such organic polymers are: starch, carboxymethyl cellulose, acrylopolymers polyethylene oxide etc., these reagents being well-known in the art for their beneficial effect on bentonites. The amount of organic polymer may be varied in a broad range from 0.25–10% of the weight of bentonite and depends upon the quality of the bentonite. For a high grade bentonite, characterised on the water loss of a slurry containing 7.5 g of bentonite of 100 ml of distilled water — API (American Petroleum Institute) test — the minimal amount of 0.25% of the organic polymer will be sufficient. There are some cases where, due to a specific use wherein an emulsive property is required — for example, in the asphalt industry — this step of the treatment with the organic polymer may be omitted. To the mixture obtained, or to the ground bentonite where no prior treatment with an organic polymer is carried out, an aqueous alkaline solution is added until a viscous slurry is obtained. The alkali solution consists of an alkali metal oxide, hydroxide, carbonate, phosphate or silicate such as NaOH, $Na_2CO_3$, KOH, $K_2CO_3$, $Mg(OH)_2$, $Ca(OH)_2$ etc. Generally, a diluted solution of 3–15% by weight is utilized, the amount of alkali being in the range of 0.2–10% by weight of the bentonite-organic polymer mass or bentonite. A too-diluted solution will require a larger amount of the alkaline solution and, accordingly, more problems will be involved in the last step of drying the activated bentonite.

The addition of the heavy metal salt is the essential feature according to the present invention. It consists of the incorporation of a heavy metal salt into the viscous slurry obtained after treatment of the bentonite with alkali solution or with the organic polymer and the alkali solution. The effective amount of heavy metal salt used may vary within a wide range and almost any amount up to 10% by weight of the pretreated bentonite will effect an improvement in the rheological properties of the bentonite. This, of course, depends on the type and quality of bentonite used. For example, when a bentonite from Sardinia, which is classified as a bad quality bentonite, is utilized, an amount of about 8% of heavy metal salt is required, whereas for a good quality bentonite such as Wyoming bentonite, even an amount of 0.1% of heavy metal salt, calculated on the pretreated bentonite, will be sufficient. Generally, the optimal range of the heavy metal salt is between 0.1–5% by weight of the pretreated bentonite mass. The cation of the heavy metal salt is selected from Fe. Ni, Zn, Co, Cr, Mn, etc. The anion of the salt may be any anion such as nitrate, chloride, bromide, oxide, sulphate etc. The requisite amount of heavy metal salt is added, either in the solid form or preferably in an aqueous solution or dispersion. Then, thorough mixing is carried out for a few minutes and the wet mixture of activated bentonite is dried in a heat-controlled dryer, the temperature being kept not above 400°C. Any standard dryer equipment heated by hot gases, electricity or infra red may be successfully utilized for this purpose.

The activated bentonite is ground and ready for use. The method may be carried out in batches or a continuous manner.

The activated bentonites prepared according to the present invention are much superior to the bentonites which are activated by the known classical method with sodium hydroxide or organic polymers. In the following tables, the results of some typical tests are given on bentonites from several countries treated according to the present invention, comparing the rheological properties with the raw bentonites and those treated with sodium hydroxide (or sodium carbonate). The tests were selected from the main requirements for drilling muds according to API specification NO. DFCF–4 on drilling fluid materials issued by Oil Companies Materials Association in May 1969.

TABLE 1

Bentonite from Cyprus
(suspension of 7.5 g bentonite/100 cc water)

| The test analyzed | Bentonite without treatment | Bentonite treated with NaOH (or Na₂CO₃) | Bentonite treated according to this invention |
|---|---|---|---|
| Marsh Viscosity - 10 min. | 30 | 32 | 46 |
| Marsh Viscosity - 2 hr. | 30 | 34 | 58 |
| Marsh Viscosity - 24 hr. | 30 | 35 | 106 |
| Thixotropy | 1 | 1.09 | 2.3 |
| Stability after 24 hr. | 50 | 50 | 0 |
| Filtration | 70 | 56 | 13 |

TABLE 1-Continued

Bentonite from Cyprus
(suspension of 7.5 g bentonite/100 cc water)

| The test analyzed | Bentonite without treatment | Bentonite treated with NaOH (or Na₂CO₃) | Bentonite treated according to this invention |
|---|---|---|---|
| (cc/30 min/7 atm) Cake height (mm) | 2 | 2 | 1.5 |

TABLE 2

Bentonite from Italy
(suspension of 7.5 g bentonite/100 cc water)

| The test analyzed | Bentonite without treatment | Bentonite treated with NaOH (or Na₂CO₃) | Bentonite treated according to this invention |
|---|---|---|---|
| Marsh Viscosity - 10 min. | 30 | 30 | 69 |
| Marsh Viscosity - 2 hr. | 30 | 30 | 103 |
| Marsh Viscosity - 24 hr. | 30 | 30 | 137 |
| Thixotropy | 1 | 1 | 1.97 |
| Stability after 24 hr. | 80 | 72 | 0 |
| Filtration (cc/30 min/7 atm) | 67 | 85 | 8.4 |
| Cake height (mm) | 3.5 | 3.5 | 1.5 |
| % Sand deposition from slurry | 12 | 12 | none |
| Yield Value (lbs/100 sq. ft.) | 0.1 | 0.1 | 13 |

TABLE 3

Bentonite from U.S.A.
(suspension of 5 g bentonite/100 cc water)

| The test analyzed | Bentonite without treatment | Bentonite treated with NaOH (or Na₂CO₃) | Bentonite treated according to this invention |
|---|---|---|---|
| Marsh Viscosity - 10 min. | 30 | 30 | 62 |
| Marsh Viscosity - 2 hr. | 30 | 30 | 79 |
| Marsh Viscosity - 24 hr. | 30 | 30 | 116 |
| Thixotropy | 1 | 1.06 | 1.37 |
| Stability after 24 hr. | 80 | 4 | 0 |
| Filtration (cc/30 min/7 atm) | 85 | 54 | 12.4 |
| Cake height (mm) | 3.5 | 2.5 | 1 |
| % Sand deposition from slurry | 5 | 5 | 0 |

TABLE 4

Bentonite from Roumania
(suspension of 5 g bentonite/100 cc water)

| The test analyzed | Bentonite without treatment | Bentonite treated with NaOH (or Na₂CO₃) | Bentonite treated according to this invention |
|---|---|---|---|
| Marsh Viscosity - 10 min. | 29 | 31 | 45 |
| Marsh Viscosity - 2 hr. | 29 | 34 | 61 |
| Marsh Viscosity - 24 hr. | 29 | 36 | 102 |
| Thixotropy | 1 | 1.15 | 2.25 |
| Stability after | 85 | 0 | 0 |

TABLE 4-Continued

| | Bentonite from Roumania (suspension of 5 g bentonite/100 cc water) | | |
|---|---|---|---|
| The test analyzed | Bentonite without treatment | Bentonite treated with NaOH (or Na$_2$CO$_3$) | Bentonite treated according to this invention |
| 24 hr. Filtration (cc/30 min/7 atm) | 90 | 21 | 9.8 |
| Cake height (mm) | 2 | 1.5 | 1 |
| % Sand deposition from slurry | 12.4 | 0.3 | 0 |

The results of the above four tables are self-explanatory. All the main rheological properties of the bentonites treated according to the present invention are remarkably improved compared with the bentonites treated with the prior art reagents. These results were obtained with bentonites from most of the places where they are known to be present. The improved results of water-loss based on filtration test (the standard method for this test) and of thixotropy indicate that the activated bentonite according to the present invention is much superior to the known activated bentonite and has properties above the normal standard required for drilling fluids. No additional reagents need be added to the activated bentonite according to the present invention in order to correct any of the rheological properties, as is necessary for the activated bentonite by the known method.

The activated bentonite according to the present invention can also be successfully used for coagulation and removal of colloidal impurities in wine, cider and beer.

Another use for the bentonite activated according to the present invention is in the preparation of pharmaceutical pastes, ointments and lotions for external use. For these uses, the suspending, gelling and adsorptive properties of the activated bentonite have remarkable values.

There are still many other areas in which the bentonite activated according to the present invention may be successfully used in view of its improved properties; examples of such uses are: cement industry, paint industry, pesticide industry, fertilizer industry, plastic and rubber industry, water clarification treatment, leather industry etc.

A person versed in the art will without doubt find many other uses for the activated bentonite obtained according to the method of the present invention, in view of its remarkable and outstanding properties.

In order to illustrate further the nature of this invention and the manner of practicing the same more fully in obtaining the activated bentonite, the following examples are presented for clearness of understanding therefrom, without being limited thereto, as modifications will be obvious to those skilled in the art.

EXAMPLE 1

An amount of 100 grams of bentonite (12% moisture content) which had poor rheological properties, ground to a fineness of +30 mesh, was thoroughly mixed with 1 gram of carboxymethyl cellulose for 5 minutes. To the mixture obtained, 0.5 grams of NaOH dissolved in 10 ml water were added and the mixing continued for 15 minutes. Next, 1 gram of MnSO$_4$ dissolved in 10 ml water was added and again mixed, thus obtaining a viscous slurry. The viscous mass was introduced into an electric oven and dried at 180°C. The product was ground to a fineness of −100+200 mesh, its moisture content being 7%. The activated bentonite obtained was very suitable as a component in drilling fluid; its water-loss property was better than the standard requirement according to API, the filtration test being 12cc/30 min/7 atm.

EXAMPLE 2

An amount of 200 grams of bentonite (14% moisture content), ground to a fineness of +70 mesh, was thoroughly mixed for 10 minutes with 1.6 grams of acrylic polymer. To the mixture obtained, 2 grams of KOH dissolved in 15 ml water were added and the mixing continued for 20 minutes. Then, 5 grams of FeCl$_3$ were added and mixed for 20 minutes. The viscous slurry was dried in an electric oven at 220°C and the product ground to a fineness of −100+200 mesh, its moisture content being 9%. The activated bentonite obtained had a plastic viscosity of 16 centipoises, this being very suitable for the manufacture of cement; the untreated original bentonite used in this example had a plastic viscosity of only 4 centipoises.

EXAMPLE 3

An amount of 100 grams of bentonite (15% moisture content), ground to a fineness of 50 mesh, was thoroughly mixed with 5 grams of carboxymethyl cellulose for 10 minutes. To the mixture obtained, 3 grams of Na-silicate dissolved in 20 ml of water were added and the mixing continued for 10 minutes. Next, 0.6 gram of Ni(NO$_3$)$_2$ dissolved in 12 ml of water was introduced and mixed for 15 mins. The viscous slurry was put in an oven heated by infra red lamps at 200°C for a few hours. The product was ground to a fineness of −100+200 mesh, its moisture content being 9%. The activated bentonite obtained had a water-loss property better than the standard requirement according to API, the filtration test being maximum 15 cc/30 min/7 atm. thus rendering it very useful for many purposes where improved rheological properties are required.

EXAMPLE 4

An amount of 100 grams of bentonite (14% moisture content) which had poor rheological properties (Marsh viscosity after 10 minutes was 30 seconds), ground to a fineness of 80 mesh, was thoroughly mixed with 2.5 grams of polyethylene oxide for 5 minutes. To the mixture obtained, 1 gram of Na$_2$CO$_3$ dissolved in 25 ml of water was added and the mixing continued for 10 minutes. After that, 0.3 g of CoCl$_2$ dissolved in 5 ml water were added and again mixed for 15 minutes, thus obtaining a viscous slurry. The viscous mass was introduced into an electric oven and dried at 280°C. The product was ground to a fineness of −100+200 mesh, its moisture content being 12%. The activated bentonite obtained had a water-loss property better than the standard requirement according to API, the filtration test being 10 cc/30 min/7 atm and thus very useful for many purposes where improved rheological properties are required.

EXAMPLE 5

An amount of 100 grams of bentonite as used in Example 4, ground to a fineness of 70 mesh, was mixed with a solution of 4 grams of $Na_2CO_3$ dissolved in 25 ml of water for a period of 20 minutes. Then, 0.6 gram of $Ni(NO_3)_2$ dissolved in 6 ml of water were added and again mixed for 20 minutes. The mass was introduced into an electric oven and dried at 320°C. The product was ground to a fineness of —100+200 mesh, its moisture content being 12%. The activated bentonite obtained was very useful in the asphalt industry, the liquid limit being 25 strokes (API and OCMA test for bentonite).

EXAMPLE 6

An amount of 200 grams of bentonite (13% moisture content) ground to a fineness of +60 mesh was thoroughly mixed for 10 minutes with 3 grams of carboxymethyl cellulose. To the mixture obtained, 50 ml of a KOH solution (16%) were added and the mixing continued for 15 minutes. Next, 1.6 grams of anhydrous $ZnSO_4$ dissolved in 10 ml of water were added and mixed for 20 minutes. The wet mass was dried in an electric oven at 150°C, to a product with 13% moisture, and then ground to a fineness of —100+200 mesh. The activated bentonite obtained had a Marsh viscosity after 10 minutes of 58 seconds and was very useful in drilling fluids.

I claim:

1. A method for the activation of bentonite which comprises treating the bentonite with 0.25-10% by weight of bentonite of an organic polymer and an aqueous alkaline solution, both known, the improvement being the incorporation into the treated bentonite of an amount of 0.01-10% by weight from the pretreated bentonite of a heavy metal salt selected from salts of Fe, Ni, Zn, Co, Cr and Mn and drying the activated bentonite mass at a temperature not higher than 400°C.

2. A method for the activation of bentonite according to claim 1 wherein the organic polymer is selected from carboxymethyl cellulose, starch, acrylo-polymers and polyethylene oxide.

3. A method for the activation of bentonite according to claim 1 wherein the alkaline solution is selected from sodium hydroxide, potassium hydroxide, sodium carbonate, sodium silicate.

4. A method for the activation of bentonite according to claim 3 wherein the amount of alkali is in the range of 0.2–10% by weight of the bentonite-organic polymer mass or bentonite.

5. A method for the activation of bentonite according to claim 1 wherein the heavy metal salt is added as an aqueous solution.

6. A method for the activation of bentonite according to claim 1 wherein the amount of heavy metal salt is in the range of 0.1–5% by weight of the pretreated bentonite.

7. A method for the activation of bentonite according to claim 1 wherein the activated bentonite is dried in a dryer heated by infra red lamps.

* * * * *